United States Patent
Yamamoto et al.

(10) Patent No.: US 8,162,228 B2
(45) Date of Patent: Apr. 24, 2012

(54) RFID TAG PRINTER AND PRINTER

(75) Inventors: Kazutaka Yamamoto, Nagoya (JP); Tsuyoshi Ohashi, Hashima (JP); Kunihiro Yasui, Nagoya (JP); Shiro Yamada, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 911 days.

(21) Appl. No.: 12/170,291

(22) Filed: Jul. 9, 2008

(65) Prior Publication Data

US 2009/0039147 A1   Feb. 12, 2009

(30) Foreign Application Priority Data

Aug. 10, 2007   (JP) .................................. 2007-210335

(51) Int. Cl.
G06K 19/06 (2006.01)
G06K 19/00 (2006.01)
G06K 7/00 (2006.01)
G06K 5/00 (2006.01)
G06F 17/00 (2006.01)
G06F 3/12 (2006.01)
G08B 13/14 (2006.01)
G08C 19/16 (2006.01)

(52) U.S. Cl. ........ 235/492; 235/375; 235/435; 235/487; 235/382; 358/1.13; 340/572.1; 340/12.52

(58) Field of Classification Search ................. 340/10.6, 340/12.52, 12.53, 572.1; 358/1.13–1.15; 235/375, 376, 382, 383, 435, 449, 451, 487, 235/492

See application file for complete search history.

(56) References Cited

U.S. PATENT DOCUMENTS

| | | | |
|---|---|---|---|
| 6,386,772 B1 * | 5/2002 | Klinefelter et al. ........... | 400/208 |
| 7,079,008 B2 * | 7/2006 | Castle et al. .................. | 340/10.1 |
| 7,254,557 B1 * | 8/2007 | Gillin et al. ..................... | 705/40 |
| 7,688,794 B2 * | 3/2010 | Tredoux et al. ................ | 370/338 |
| 2002/0016836 A1 * | 2/2002 | Suzuki et al. ................. | 709/223 |
| 2003/0059050 A1 * | 3/2003 | Hohberger et al. ........... | 380/270 |
| 2003/0160992 A1 * | 8/2003 | Weaver ........................ | 358/1.14 |
| 2004/0070784 A1 * | 4/2004 | Shannon ...................... | 358/1.15 |
| 2004/0181681 A1 * | 9/2004 | Salisbury ..................... | 713/200 |
| 2004/0217178 A1 * | 11/2004 | Lasch et al. .................. | 235/488 |
| 2004/0257601 A1 * | 12/2004 | Tomiyasu et al. ............. | 358/1.9 |
| 2005/0043883 A1 * | 2/2005 | Iwase et al. .................. | 701/200 |
| 2005/0218219 A1 * | 10/2005 | Sano et al. .................... | 235/383 |
| 2005/0230479 A1 * | 10/2005 | Chapman et al. ........ | 235/462.13 |
| 2005/0264846 A1 * | 12/2005 | Tsuzuki ...................... | 358/1.18 |

(Continued)

FOREIGN PATENT DOCUMENTS

JP   2001307042 A   11/2001

(Continued)

*Primary Examiner* — Daniel Walsh
(74) *Attorney, Agent, or Firm* — Baker Botts L.L.P.

(57) ABSTRACT

Data is transferred from an operating device to a printer for printing with a simple operation. It is determined whether or not a printer ID received by a RFID tag for a printer of a printer via radio communication from a mobile terminal matches a printer ID of the printer of itself, and when the printer ID matches, printing data received by the RFID tag for a printer via radio communication from the mobile terminal is stored in a memory part of the RFID tag for a printer and then, the printing data is transmitted to a printer main body through a reader from the RFID tag for a printer and printed by a print head of the printer main body.

7 Claims, 11 Drawing Sheets

U.S. PATENT DOCUMENTS

| | | |
|---|---|---|
| 2005/0270567 A1* | 12/2005 | Du et al. .................. 358/1.15 |
| 2005/0275880 A1* | 12/2005 | Korst et al. .............. 358/1.15 |
| 2006/0155063 A1* | 7/2006 | Kwok et al. .................. 525/88 |
| 2006/0191022 A1* | 8/2006 | Hohberger et al. .......... 726/30 |
| 2006/0206735 A1* | 9/2006 | Nagafusa .................. 713/300 |
| 2007/0018785 A1* | 1/2007 | Chi ............................ 340/5.2 |
| 2007/0133041 A1* | 6/2007 | Tredoux et al. ........... 358/1.15 |
| 2007/0133485 A1* | 6/2007 | Tredoux et al. ........... 370/338 |
| 2007/0273519 A1* | 11/2007 | Ichikawa et al. .......... 340/572.1 |
| 2007/0297814 A1* | 12/2007 | Kasai ........................... 399/12 |
| 2009/0039147 A1* | 2/2009 | Yamamoto et al. ........ 235/375 |
| 2009/0072019 A1* | 3/2009 | Shibata et al. ............ 235/375 |
| 2009/0174893 A1* | 7/2009 | Fujii et al. ................. 358/1.15 |
| 2009/0256672 A1* | 10/2009 | Yamamoto et al. ........ 340/5.2 |
| 2009/0296140 A1* | 12/2009 | Sugiyama et al. ......... 358/1.15 |

FOREIGN PATENT DOCUMENTS

JP          2005122224 A          5/2005

* cited by examiner

[FIG. 1]
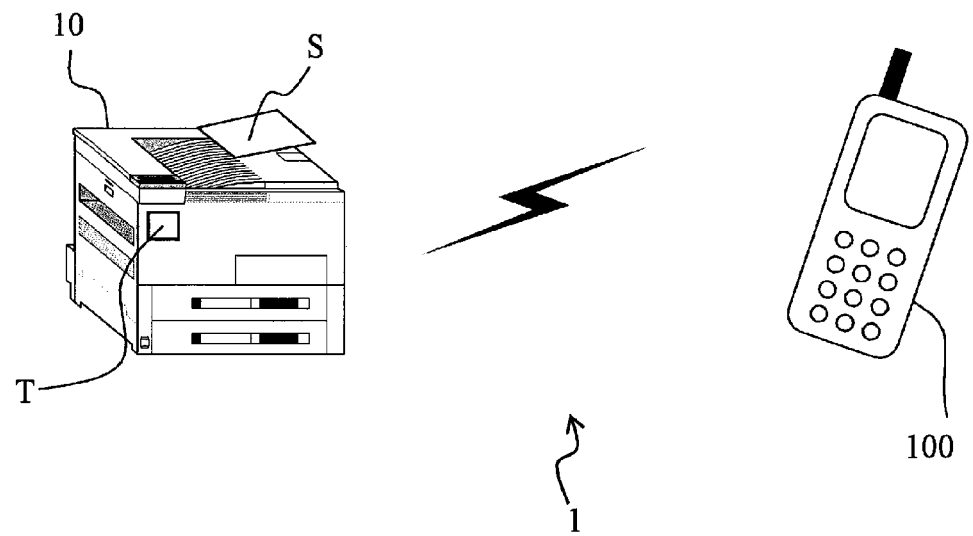
[FIG. 2]
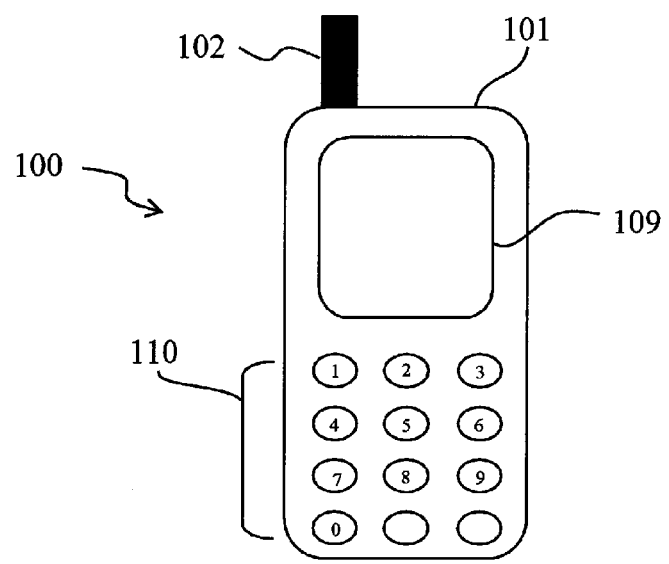

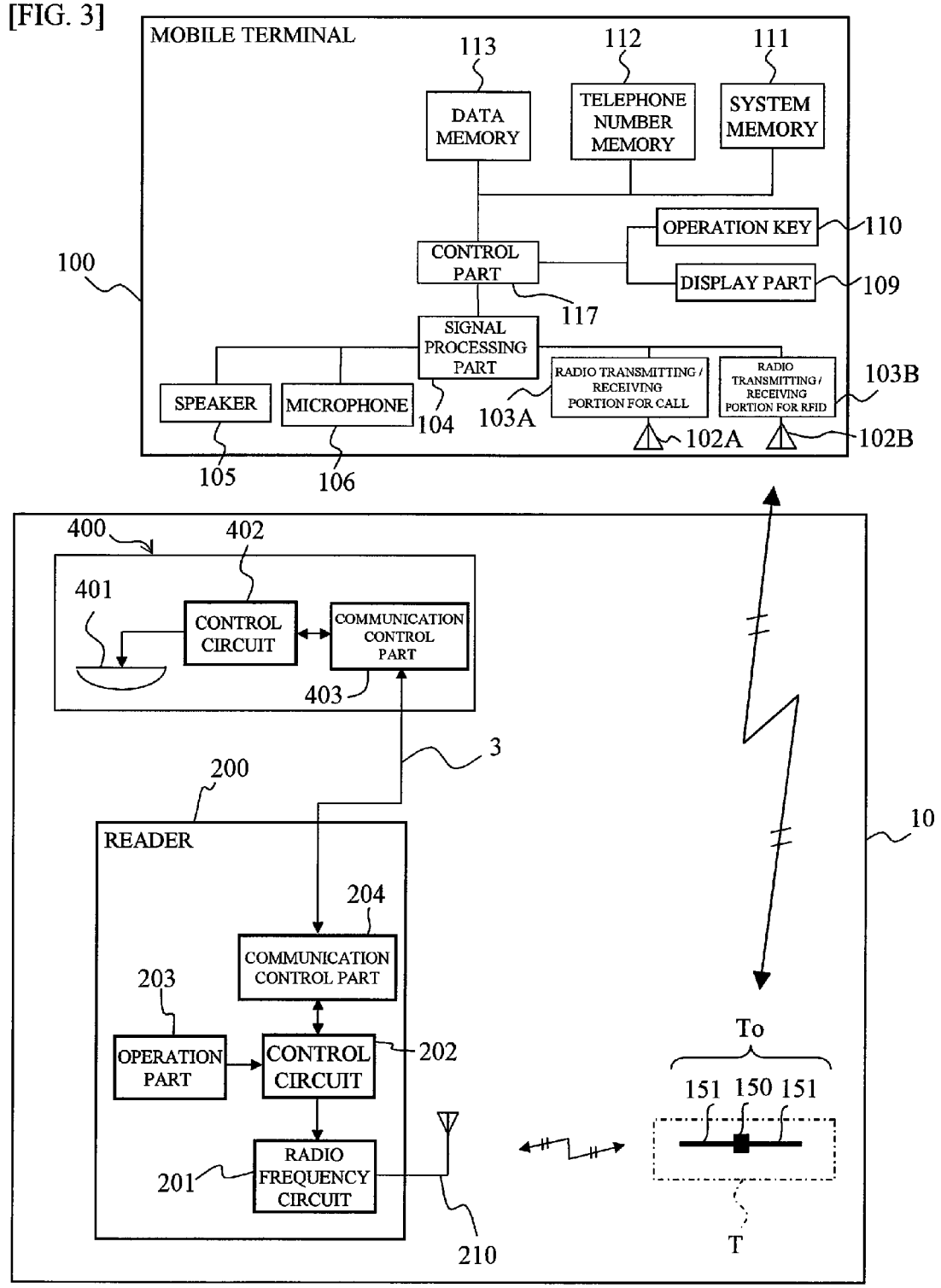

[FIG. 4]
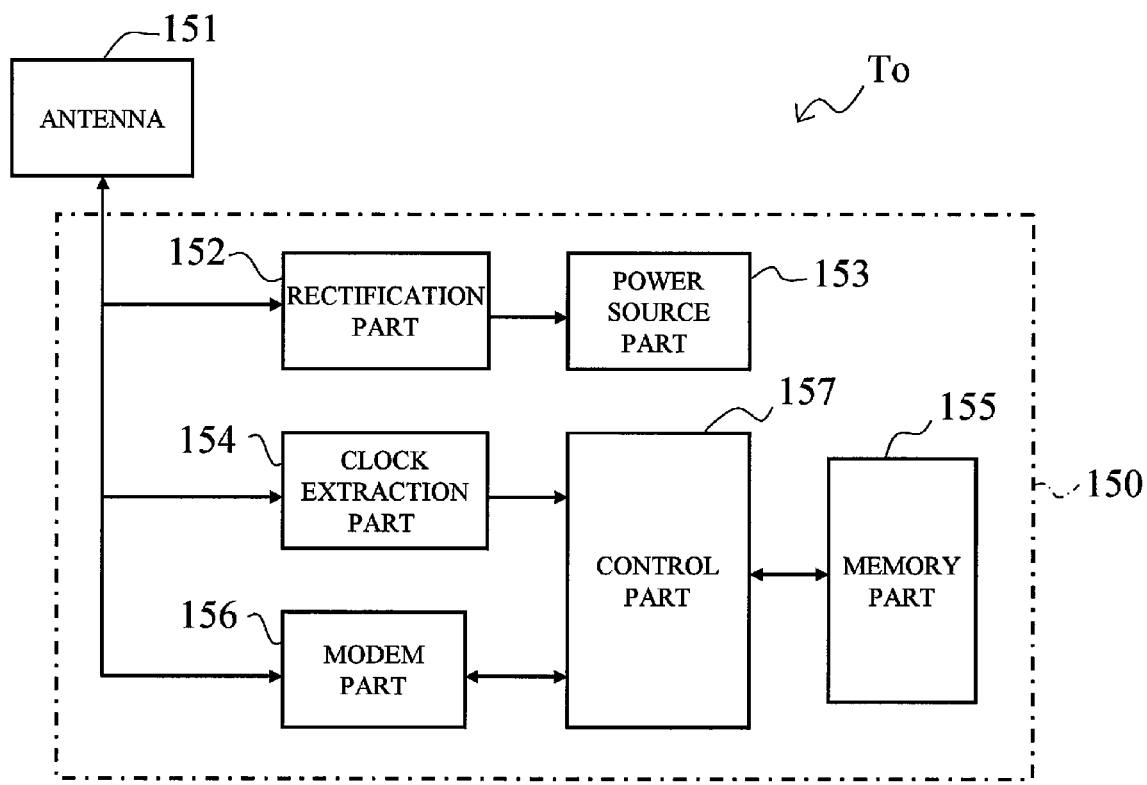

[FIG. 5]
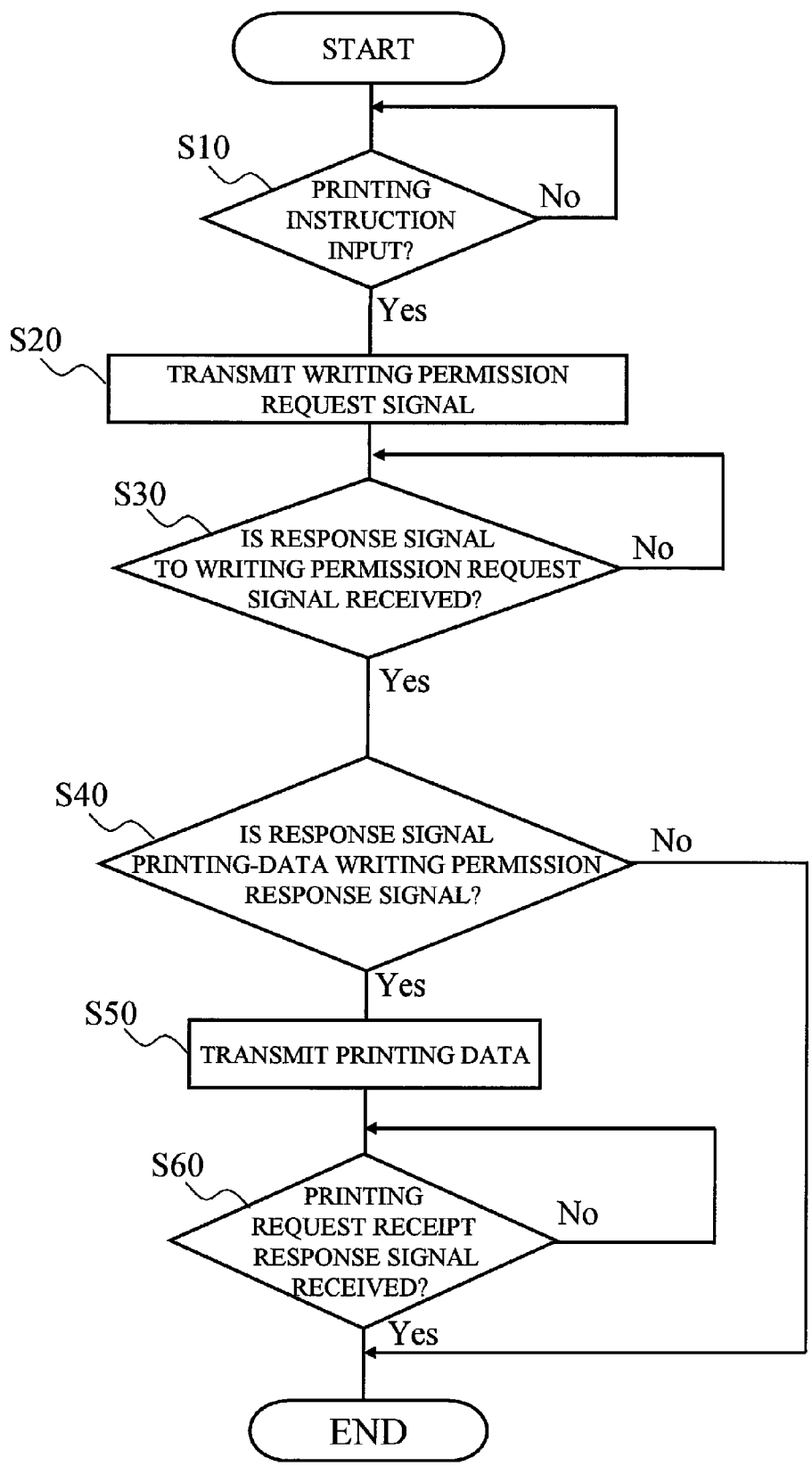

[FIG. 6]
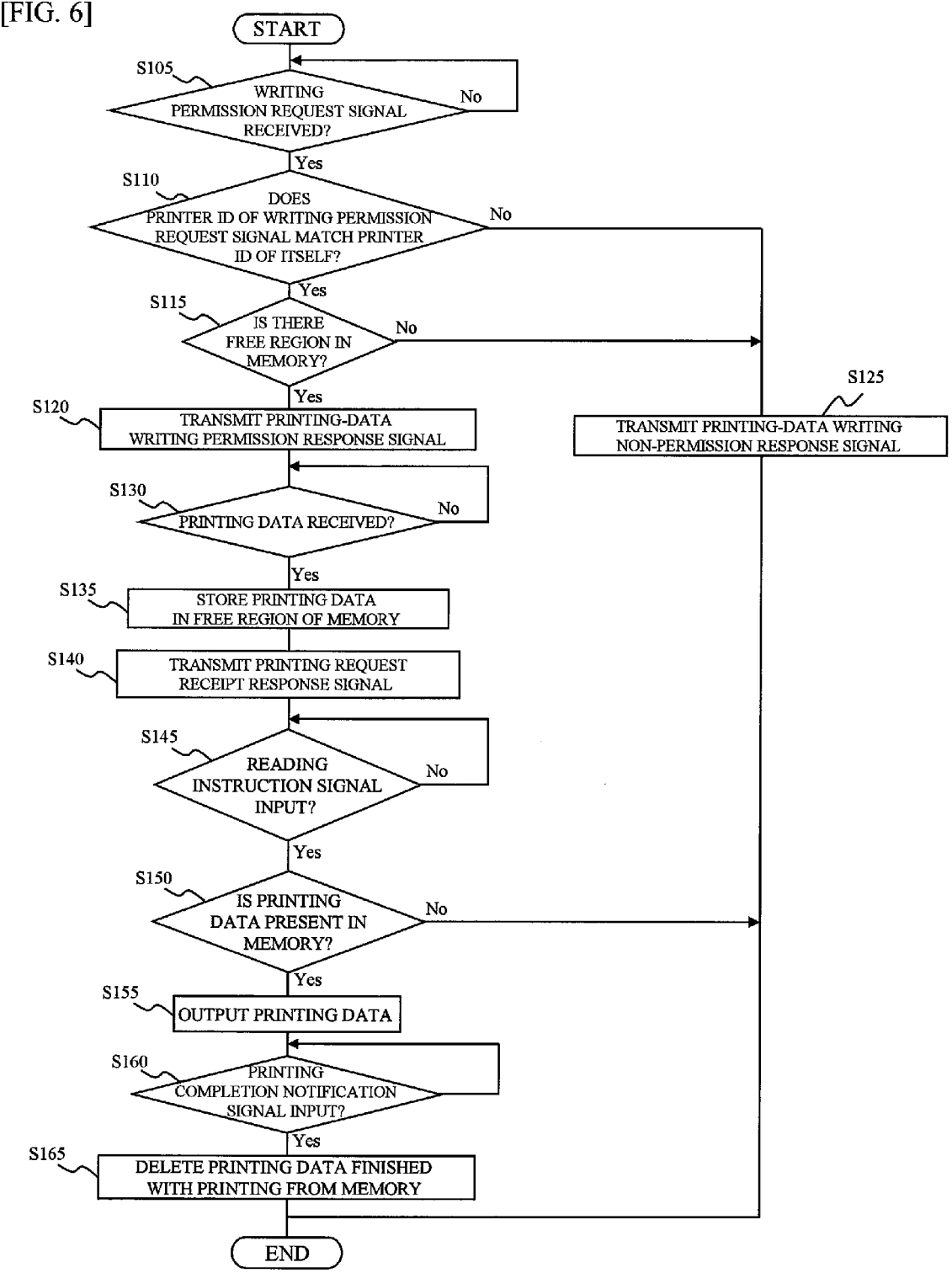

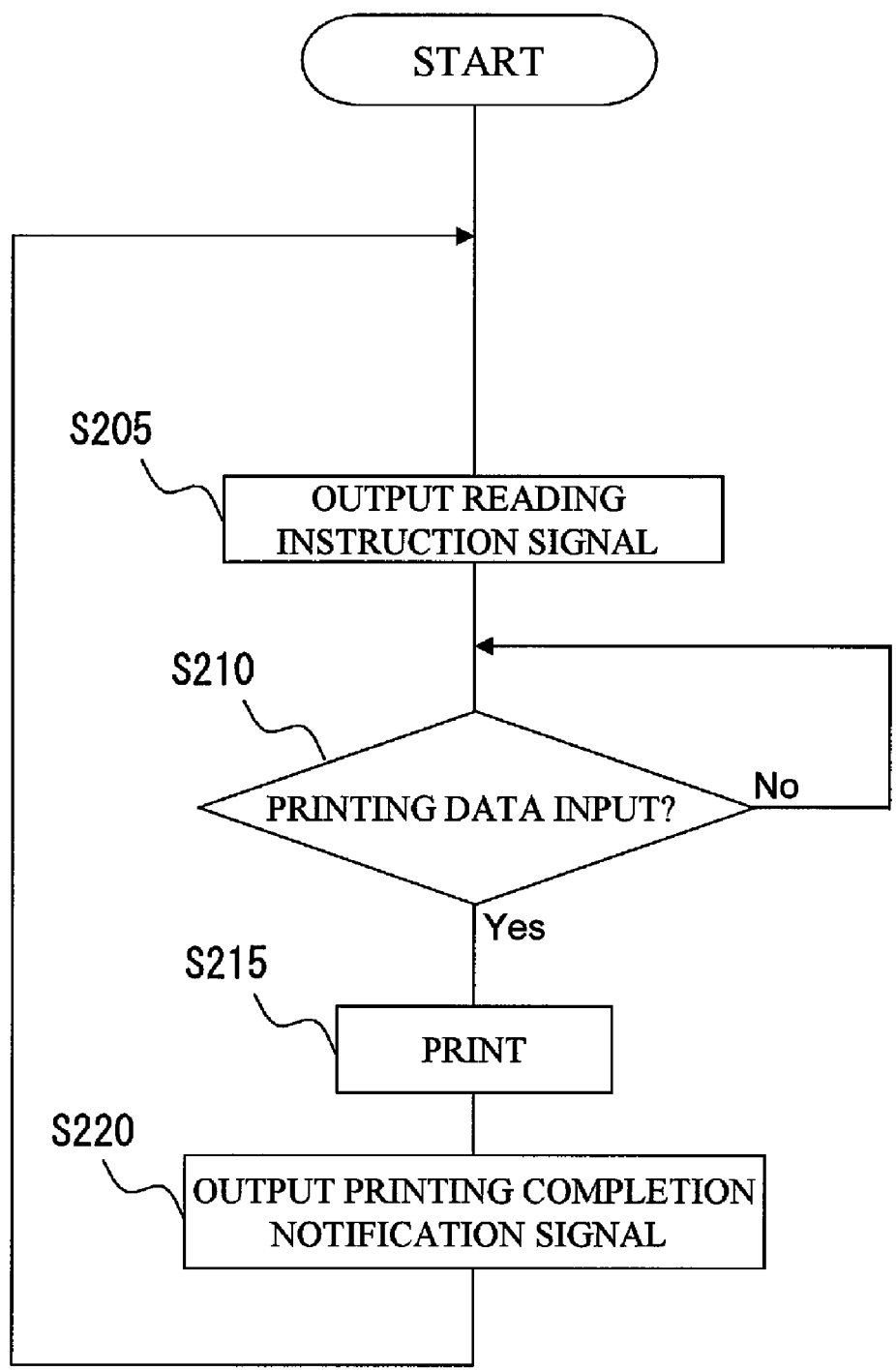
[FIG. 7]

[FIG. 8]
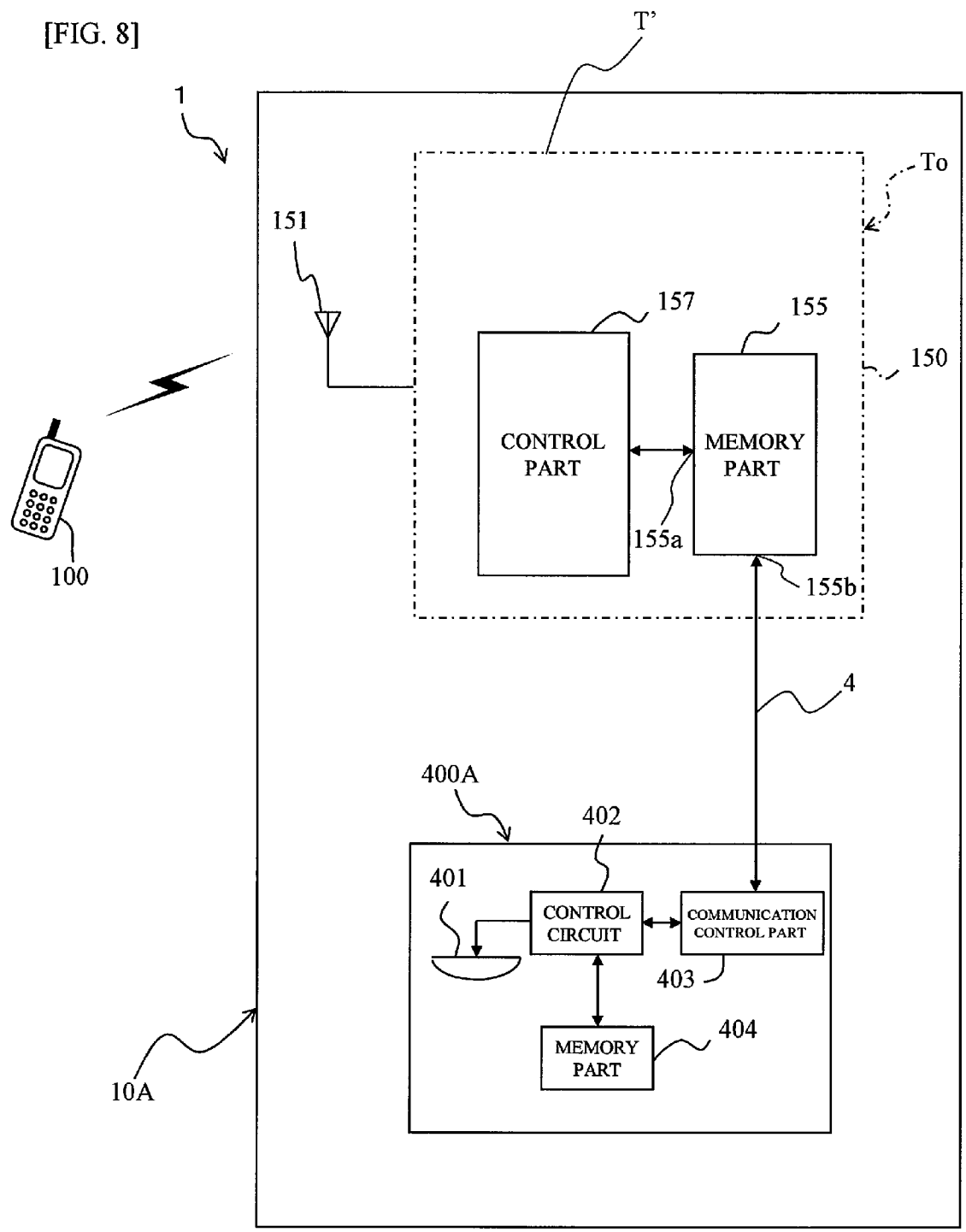

[FIG. 9]
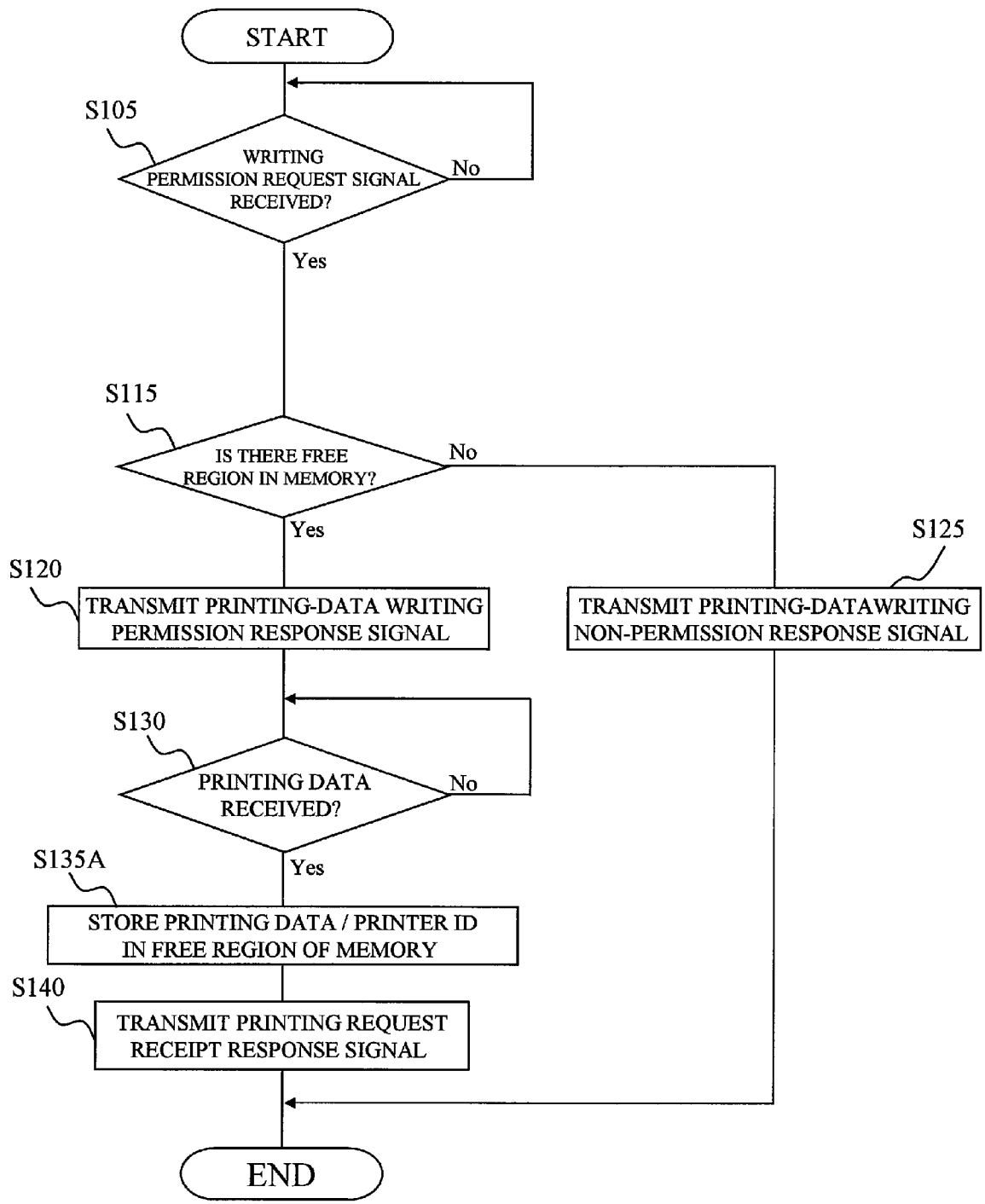

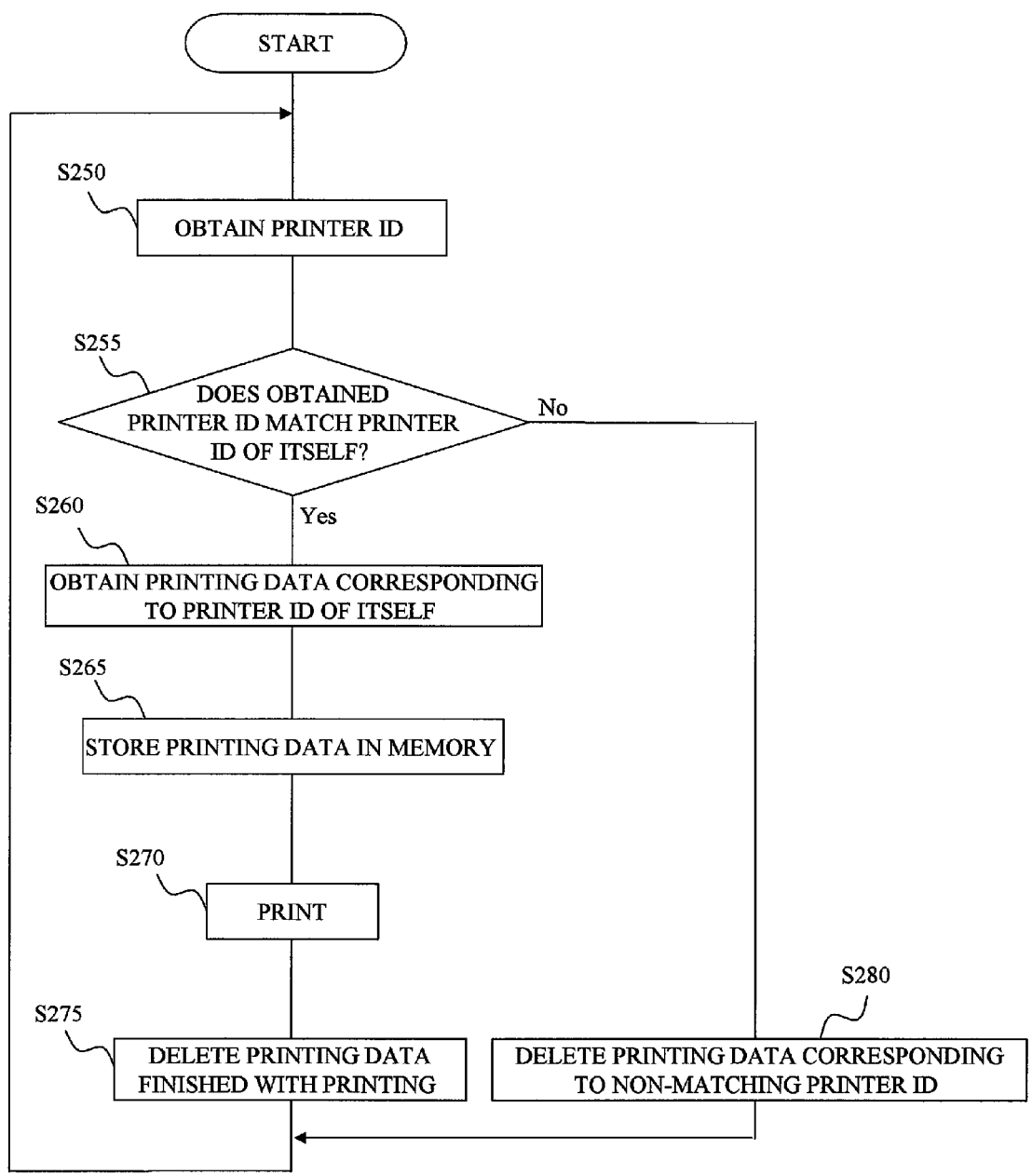
[FIG. 10]

[FIG. 11]
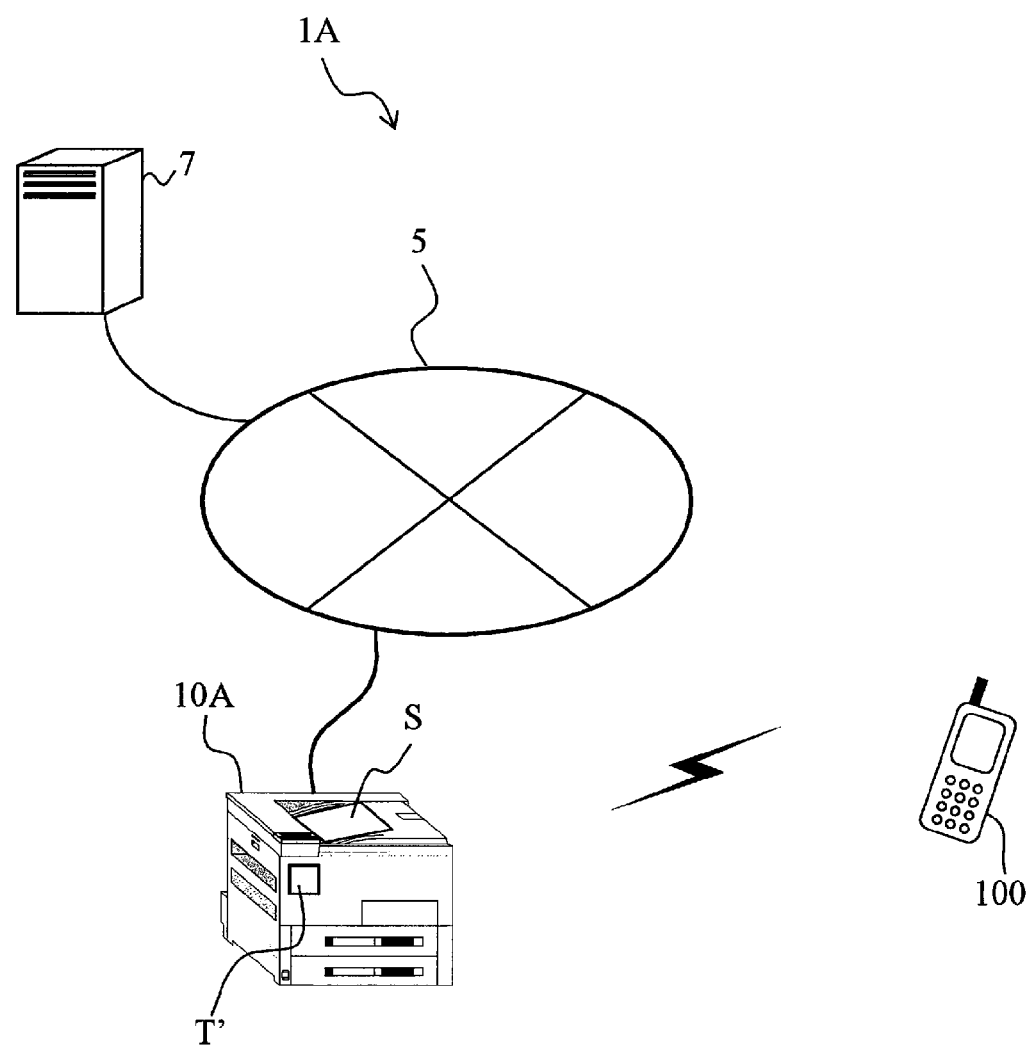

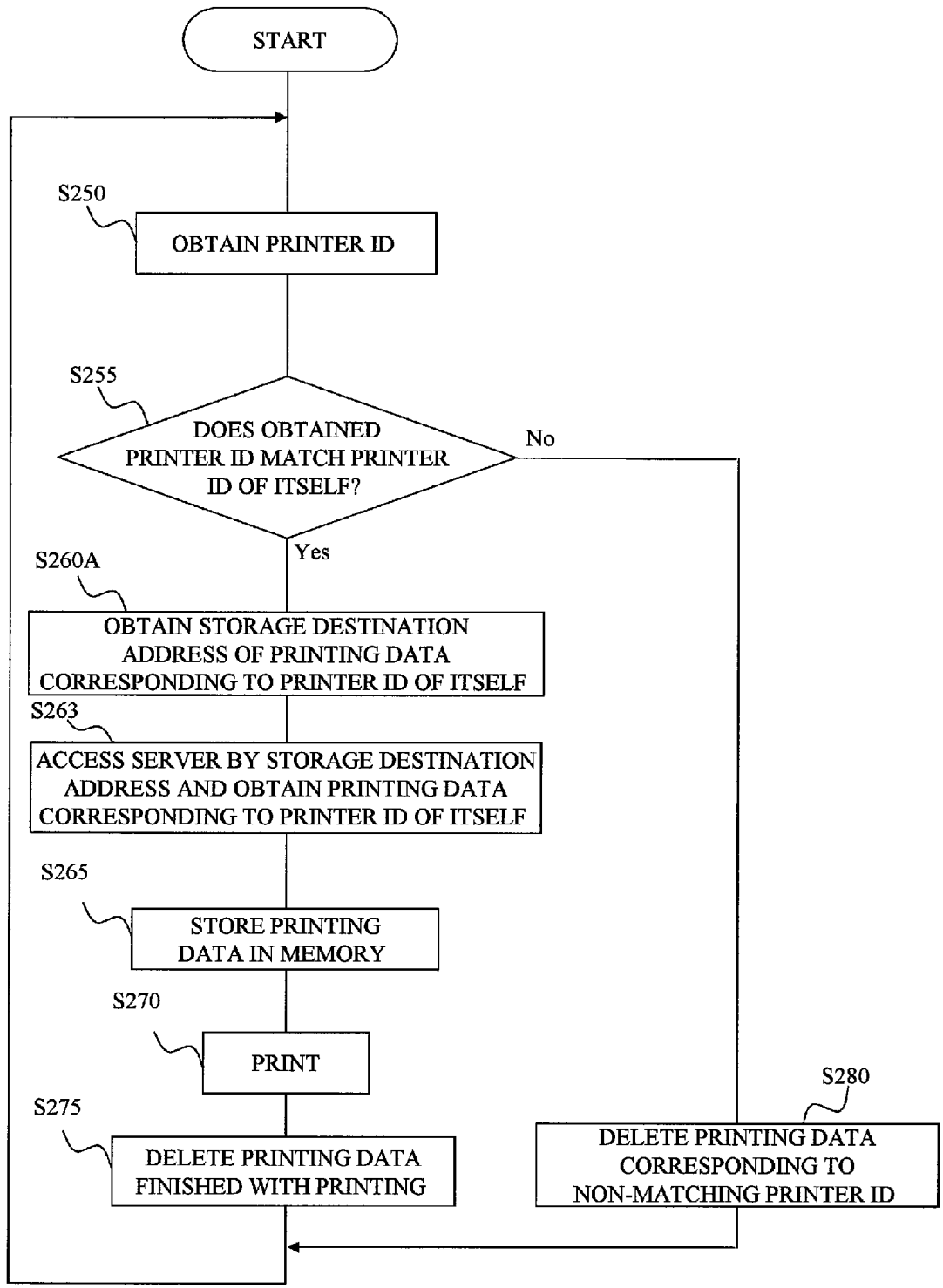
[FIG. 12]

US 8,162,228 B2

RFID TAG PRINTER AND PRINTER

CROSS-REFERENCE TO RELATED APPLICATIONS

This application claims priority from JP 2007-210335, filed Aug. 10, 2007, the contents of which are hereby incorporated by reference.

BACKGROUND OF THE INVENTION

1. Field of the Invention

The present invention relates to a RFID tag for a printer provided with a function capable of information transmission/reception with the outside and used for printing of a printer and a printer that carries out printing using the same.

2. Description of the Related Art

A RFID (Radio Frequency Identification) system that carries out information reading/writing contactlessly between a small-sized RFID tag and a reader (reading device)/writer (writing device) is known. A RFID circuit element provided at the RFID tag includes: an IC circuit part storing predetermined RFID tag information; and an antenna connected to the IC circuit part and carrying out information transmission/reception, and even if the RFID tag is stained or arranged in an invisible position, an access (information reading/writing) can be made from the reader/writer side to the RFID tag information of the IC circuit part, and the system is being put into practice in various fields including product management, inspection process and the like.

A prior art in which the RFID system is applied to a printed material, for example, is described in JP, A, 2001-307042. In this prior art, URL information of a web site relating to a printed material is stored in the RFID tag attached to the printed material (page of a publication and the like), and when the RFID tag information is read out by the reader from the RFID circuit element, the URL information can be got. By this arrangement, the URL information of the web site relating to the contents of the printed material can be got surely and easily.

Suppose a case where an access is to be made to a web site or the like by an operating device such as a mobile terminal in order to print got information as a printed material. In this case, it is generally necessary to connect the operating device and a printer or a personal computer to each other by physical wiring and to transfer data to the printer for printing. Alternatively, it is necessary to attach data to an e-mail and transfer it to the personal computer and to make a print by operating the printer from the personal computer. Since connection between the operating device and the printer and operation such as attachment to an e-mail are required, a burden of operation on an operator is huge and inconvenient.

The prior art is to store the URL information of the web site relating to the printed material in the RFID tag, and utilization of the RFID tag at printing of the information got from the web site and the like as above is not particularly given consideration.

SUMMARY OF THE INVENTION

The present invention has an object to provide a RFID tag for a printer and a printer that can transfer data from an operating device to a printer with a simple operation for printing.

BRIEF DESCRIPTION OF THE DRAWINGS

FIG. 1 is a system block diagram illustrating entire configuration of a printing system having a printer (printing device) according to a first embodiment of the present invention.

FIG. 2 is an appearance view illustrating an entire structure of a mobile terminal shown in FIG. 1.

FIG. 3 is a functional block diagram illustrating a detailed function of the mobile terminal and the printer shown in FIG. 1.

FIG. 4 is a block diagram illustrating an example of functional configuration of a RFID circuit element provided at a RFID tag for a printer shown in FIG. 3.

FIG. 5 is a flowchart illustrating a printing processing control procedure executed by a control part of the mobile terminal shown in FIG. 3.

FIG. 6 is a flowchart illustrating a printing processing control procedure executed by a control part of the RFID circuit element provided at the RFID tag for a printer shown in FIG. 4.

FIG. 7 is a flowchart illustrating a printing processing control procedure executed by a control circuit of a printer main body shown in FIG. 3.

FIG. 8 is a functional block diagram illustrating a detailed function of a printer in the printing system having a printer (printing device) according to a second embodiment of the present invention.

FIG. 9 is a flowchart illustrating a printing control procedure executed by the control part of the RFID circuit element provided at the RFID tag for a printer shown in FIG. 8.

FIG. 10 is a flowchart illustrating a printing processing control procedure executed by the control circuit of the printer main body shown in FIG. 8.

FIG. 11 is a system block diagram illustrating entire configuration of the printing system in a variation when printing data is got from the network.

FIG. 12 is a flowchart illustrating a printing processing control procedure executed by the control circuit of the printer main body of the printer shown in FIG. 11.

DETAILED DESCRIPTION OF THE PREFERRED EMBODIMENTS

An embodiment of the present invention will be described below referring to the attached drawings. First, a first embodiment of the present invention will be described referring to FIGS. 1 to 7.

FIG. 1 is a system block diagram illustrating entire configuration of a printing system having a printer (printing apparatus) of this embodiment.

In FIG. 1, a printing system 1 has a printer 10 provided with a RFID tag T for printer and a mobile terminal (operating device) 100 capable of operation of the printer 10 via radio communication (details will be described later) and produces a printed material S such as a voucher by instructing printing execution by operation of the mobile terminal 100 so as to make a print on a print-receiving object such as predetermined sheet and the like by the printer 10.

FIG. 2 is an appearance diagram illustrating an entire structure of the mobile terminal 100. In FIG. 2, the mobile terminal 100 is a known cellular-phone type terminal having a telephone function, network function, and short range communication function such as IEEE 802.15.1 and the like and has a display part 109 for various displays and a plurality of operation keys 110 for various operation inputs based on number input when the telephone function is used or display information in the display part 109 on a front panel.

FIG. 3 is a functional block diagram illustrating a detailed function of the mobile terminal 100 and the printer 10. In FIG. 3, the mobile terminal 100 has its components controlled and operated by a control part 117 including a CPU and the like.

A sound signal in a call is processed by a call antenna 102A, a radio transmitting/receiving portion 103A for call and a signal processing part 104. That is, a transmission wave from another telephone device is received by the call antenna 102A, demodulated at the radio transmitting/receiving portion 103A for call and a received signal is generated. The received signal is subjected to signal processing for reproduction at the signal processing part 104 and reproduced as sound from a speaker 105. On the other hand, voice of a user is input to a microphone 106 and converted to a sound signal. This sound signal is subjected to signal processing for transmission at the signal processing part 104 and transmitted to the radio transmitting/receiving portion 103A for call. The radio transmitting/receiving portion 103A for call modulates the sound signal from the signal processing part 104 and supplies it to the call antenna 102A, while the call antenna 102A transmits the sound signal as an electric wave. Similarly, a radio transmitting/receiving portion 103B for RFID configured to perform communication with the printer 10 via a RFID antenna 102B according to control of the control part 117 is provided.

To the control part 117, a system memory 111, a telephone number memory 112, and a data memory 113 are connected. The system memory 111 stores a program configured to execute various functions of the mobile terminal 100 in advance. The telephone number memory 112 records a plurality of telephone numbers in association with the name of the other party. The data memory 113 stores various data such as a printer ID (printer-individual identification information) that identifies and specifies the printer 10 and printing data and the like to execute the printing.

The printer 10 has a printer main body 400, a reader (reading device) 200 arranged inside the printer main body 400, and the RFID tag T for printer affixed on the side face of the printer main body 400 and provided with the RFID circuit element To. It is only necessary that the RFID tag T for printer is located in a communication range of the reader 200 only at communication, and the tag does not have to be provided fixedly at the printer 10.

The printer main body 400 has a print head (printing device) 401 configured to print the printing data sent from the mobile terminal 100 on the print-receiving object, a control circuit 402 configured to control an entire operation of the printer main body 400 including the print head 401, and a communication control part 403 configured to control communication with the reader 200 through a connecting device 3.

The reader 200 has an antenna 210 configured to transmit/receive a signal with an antenna 151 of the RFID circuit element To provided at the RFID tag T for printer via radio communication, a radio frequency circuit 201 configured to make an access (for reading in this example) to the IC circuit part 150 of the RFID circuit element To through the antenna 210 and to process a signal read out of the RFID circuit element To, a control circuit 202 including a function to process the signal read out of the IC circuit part 150 of the RFID circuit element To through the radio frequency circuit 201 so as to read out information and to generate access information to access the IC circuit part 150 of the RFID circuit element To and configured to control the entire operation of the reader 200, an operation part 203 provided with an appropriate button, key and the like that can be operated by the operator, and a communication control part 204 configured to control communication with the printer main body 400 through the connecting device 3.

FIG. 4 is a block diagram illustrating an example of functional configuration of the RFID circuit element To provided at the RFID tag T for printer.

In FIG. 4, the RFID circuit element To has the antenna 151 configured to transmit/receive a signal contactlessly with an antenna 102B for RFID of the mobile terminal 100 and the antenna 210 of the reader 200 using a radio frequency such as a short-wave band, a UHF band or a micro-wave band and the like and the IC circuit part 150 connected to the antenna 151.

The IC circuit part 150 includes a rectification part 152 configured to rectify an interrogation wave received by the antenna 151, a power source part 153 configured to accumulate energy of the interrogation wave rectified by the rectification part 152 and to make it a driving power source, a clock extraction part 154 configured to extract a clock signal from the interrogation wave received by the antenna 151 and to supply it to a control part 157, a memory part 155 that can store a predetermined information signal, a modem part 156 connected to the antenna 151, and the control part 157 configured to control operation of the RFID circuit element To through the memory part 155, the rectification part 152, the clock extraction part 154, the modem part 156 and the like.

The modem part 156 demodulates the interrogation wave from the antenna 102B for RFID of the mobile terminal 100 received by the antenna 151 and the antenna 210 of the reader 200 and modulates a reply signal from the control part 157 and transmits it to the antenna 151 as a response wave.

The control part 157 executes basic control such as interpretation of a received signal demodulated by the modem part 156, generation of a reply signal based on the information signal stored in the memory part 155, reply of it by the modem part 156 and the like.

The clock extraction part 154 extracts a clock component from the received signal and extracts it to the control part 157 and supplies the clock corresponding to a frequency of the clock component of the received signal to the control part 157.

FIG. 5 is a flowchart illustrating a printing process control procedure executed by the control part 117 of the mobile terminal 100.

In FIG. 5, first at Step S10, it is determined whether or not an operator gives an instruction input of printing by the printer 10 using the operation key 110. If the instruction input of printing is made, the determination is satisfied, and the routine goes to the subsequent Step S20.

At Step S20, a printer ID (printer-individual identification information) of the printer 10 to execute the printing is specified, a printing-data writing permission request signal including the printer ID information is transmitted to the RFID circuit element To provided at the RFID tag T for printer of the printer 10 corresponding to the printer ID, and the routine goes to the subsequent Step S30.

At Step S30, it is determined whether or not a response signal to the printing-data writing permission request signal is received from the RFID circuit element To provided at the printer 10. If the response signal to the printing-data writing permission request signal is received, the determination is satisfied, and at the subsequent Step S40, it is determined if the response signal is a printing-data writing permission response signal (which will be described later) or a printing-data writing non-permission response signal (which will be described later). If the printing-data writing permission response signal is received, the routine goes to the subsequent Step S50. If the printing-data writing non-permission response signal is received, this flow is finished.

At Step S50, display information in the display part 109 and information stored in the data memory 113 are transmitted to the RFID tag T for printer as the printing data of the printer 10 and the routine goes to the subsequent Step S60.

At Step S60, it is determined whether or not a printing request receipt response signal (which will be described later) is received from the RFID circuit element To of the RFID tag T provided at the printer 10. If the printing request receipt response signal is received, the determination is satisfied, this flow is finished.

FIG. 6 is a flowchart illustrating a printing processing control procedure executed by the control part 157 of the RFID circuit element To provided at the RFID tag T for printer.

In FIG. 6, first at Step S105, it is determined whether or not the printing-data writing permission request signal is received from the mobile terminal 100. If the printing-data writing permission request signal is received, the determination is satisfied, and the routine goes to the subsequent Step S110.

At Step S110, it is determined whether or not the printer ID of the printing-data writing permission request signal matches the printer ID of the printer 10 of itself. If the printer ID of the printing-data writing permission request signal matches the printer ID of the printer 10 of itself, the determination is satisfied and the routine goes to Step S115, while if the printer ID of the printing-data writing permission request signal does not match the printer ID of the printer 10 of itself, the determination is not satisfied, and the routine goes to Step S125.

At Step S115, a remaining memory capacity of the memory part 155 of the RFID circuit element To is detected, and it is determined whether or not the memory part 155 has a free memory region. If the memory part 155 has a free memory region, the determination is satisfied, and the routine goes to Step S120, while if the memory part 155 does not have a free memory region, the determination is not satisfied, and the routine goes to Step S125.

At Step S120, a printing-data writing permission response signal (transmission-permission notification) notifying that the printing data can be written is transmitted to the mobile terminal 100, and the routine goes to Step S130. On the other hand, at Step S125, a printing-data writing non-permission response signal (transmission-non-permission notification) notifying that the printing data can not be written is transmitted to the mobile terminal 100, and this flow is finished.

At Step S130, it is determined whether or not the printing data transmitted from the mobile terminal 100 is received. If the printing data is received, the determination is satisfied, and the routine goes to the subsequent Step S135. At Step S135, the received printing data is stored in the free memory region of the memory part 155. Then, at the subsequent Step S140, a printing request receipt response signal (writing-completion notification) notifying that the writing of the printing data in the RFID circuit element To has been completed is transmitted to the mobile terminal 100, and the routine goes to the subsequent Step S145.

At Step S145, it is determined whether or not a reading-instruction signal (which will be described later) is input from the printer main body 400 through the reader 200. If the reading-instruction signal is input, the determination is satisfied, and the routine goes to the subsequent Step S150, where it is determined whether or not the printing data corresponding to the printer ID of the printer 10 of itself is present in the memory part 155. If the printing data is present in the memory part 155, the determination is satisfied, and the routine goes to the subsequent Step S155, while if the printing data is not present in the memory part 155, the determination is not satisfied, and this flow is finished.

At Step S155, the printing data corresponding to the printer ID of the printer 10 of itself is read out of the memory part 155, duplicated data of the printing data is transferred to the printer main body 400 through the reader 200, and the routine goes to the subsequent Step S160.

At Step S160, it is determined whether or not a printing completed notification signal (which will be described later) is input from the printer main body 400 through the reader 200. If the printing-completion notification signal is input, the determination is satisfied, and the routine goes to the subsequent Step S165, and the printing data for which printing is completed is deleted from the memory part 155, and this flow is finished.

FIG. 7 is a flowchart illustrating a printing processing control procedure executed by the control circuit 402 of the printer main body 400. This flow is started when the printer 10 is powered on.

In FIG. 7, first, at Step S205, a reading-instruction signal that reads the printing data stored in the memory part 155 of the RFID circuit element To is sent to the RFID tag T for printer through the reader 200 and the routine goes to the subsequent Step S210.

At Step S210, it is determined whether or not the printing data (duplicated data) read out of the memory part 155 of the RFID circuit element To is input through the reader 200. If the printing data is input, the determination is satisfied, and the routine goes to the subsequent Step S215. At Step S215, a control signal is output to the print head 401 so as to start the print head 401, printing is applied on the print-receiving object based on the input printing data, and the routine goes to the subsequent Step S220.

At Step S220, the printing-completion notification signal notifying that the printing based on the printing data is completed is sent to the RFID circuit element To of the RFID tag T for printer through the reader 200 and the routine returns to Step S205.

Next, an operation of printing by the printing system 1 of this embodiment will be described. Here, suppose that WEB information displayed on the display part 109 of the mobile terminal 100 is printed.

An operator of the mobile terminal 100 accesses a desired site by operation of the operation key 110, gets the WEB information and has it displayed on the display part 109 (similarly to a commonly known method, and the description will be omitted). After that, the operator watches the WEB information displayed on the display part 109 and makes a printing instruction input by the operation key 110. Then, the mobile terminal 100 transmits the printing data writing permission request signal including the printer ID information of the printer 10 to execute the printing.

The printing data writing permission request signal is received by the RFID tag T for printer of the printer 10. The RFID tag T for printer determines if the printer ID of the printing data writing permission request signal matches the printer ID of the printer 10 of itself, and if the printer ID does not match, the printing data writing non-permission response signal is sent to the mobile terminal 100. If the printer ID matches, it is determined if a free memory region is present in the memory part 155 of the RFID circuit element To, and if there is no free memory region in the memory part 155, the printing data writing non-permission response signal is transmitted to the mobile terminal 100. If there is a free memory region in the memory part 155, the printing data writing permission response signal is transmitted to the mobile terminal 100.

The mobile terminal 100 transmits the printing data to be printed (the WEB information on display in this example) to the RFID tag T for printer of the printer 10. When the printing data is received from the mobile terminal 100, the RFID tag T for printer stores the printing data in the free memory region in the memory part 155. After that, the printing request receipt response signal is transmitted from the RFID tag T for printer to the mobile terminal 100. By this arrangement, the operator can get to know at the mobile terminal 100 that the printing data transmitted to the RFID tag T for printer has been successfully written.

Here, since writing of the printing data in the RFID tag T for printer is possible even if the printer 10 is not powered on, printing can be executed after the printer 10 is powered on.

If the printer 10 has been already powered on, the reading-instruction signal is transmitted from the printer main body 400 to the RFID tag T for printer through the reader 200, by which the printing data (duplicated data) stored in the memory part 155 of the RFID tag T for printer is transferred to the printer main body 400 through the reader 200.

Then, the printer main body 400 drives the print head 401 and carries out printing on the print-receiving object based on the printing data so that the print-receiving object S is produced. After that, the printing-completion notification signal from the printer main body 400 is sent to the RFID tag T for printer through the reader 200. Then, the printing data for which the printing has been completed is deleted from the memory part 155 of the RFID tag T for printer. By this arrangement, the printing processing by the printing system is completed.

On the other hand, if the power source of the printer 10 is off, when it is powered on after that, the reading-instruction signal from the printer main body 400 is sent to the RFID tag T for printer through the reader 200, the printing operation is executed by the processing similar to the above.

In the above, Step S110 shown in FIG. 6 executed by the control part 157 of the RFID circuit element To constitutes the first determining portion configured to determine if the printer-individual identification information received by tag antenna 151 from the operating device 100 capable of instructing printing execution by the printer 10 via radio communication matches the printer-individual identification information of the printer 10.

The memory part 155 of the RFID circuit element To and Step S135 shown in FIG. 6 constitute the first storage portion configured to store the printing data received by the tag antenna 151 and corresponding to the printer-individual identification information or the storage-destination information of the printing data when it is determined by the first determining portion that the received printer-individual identification information matches the printer-individual identification information of the printer 10.

Step S140 shown in FIG. 6 constitutes the output portion for a writing-completion notification configured to output a writing-completion notification of the printing data or the storage-destination information of the printing data to the operating device 100 via radio communication after storing the printing data or the storage-destination information of the printing data in the first storage portion.

Step S115 shown in FIG. 6 constitutes the capacity detecting portion configured to detect a remaining storage capacity of the first storage portion 155 prior to storage of the printing data or the storage-destination information of the printing data in the first storage portion 155 when it is determined by the first determining portion that the received printer-individual identification information matches the printer-individual identification information of the printer 10.

Step S120 shown in FIG. 6 constitutes the output portion for a permission notification configured to output a transmission-permission notification of the printing data or the storage-destination information of the printing data to the operating device 100 via radio communication according to the remaining storage capacity of the first storage portion 155 detected by the capacity detecting portion.

Steps S145 to S155 shown in FIG. 6 constitute the output portion for a printing data configured to output the printing data or the storage-destination information of the printing data stored in the first storage portion or its duplicated data to the printer 400 according to a reading-instruction signal input from the printer 400.

Steps S160 to S165 shown in FIG. 6 constitute first deleting portion for a printing data configured to perform deletion processing on the printing data or the storage-destination information of the printing data stored in the first storage portion according to the printing-completion notification input from the printer 400.

Step S125 shown in FIG. 6 constitutes the output portion for a non-permission notification configured to output the transmission-non-permission notification of the printing data or the storage-destination information of the printing data to the operating device 100 via radio communication when it is determined by the first determining portion that the received printer-individual identification information does not match the printer-individual identification information of the printer 10.

As mentioned above, in this embodiment, if the printer ID from the mobile terminal 100 received by the RFID tag T for printer of the printer 10 matches the printer ID of the printer 10 of itself, the printing data is sent to the RFID tag T for printer from the mobile terminal 100 and then, the printing data is sent to the printer main body 400 from the RFID tag T for printer through the reader 200. As a result, the printing can be performed by the printer 10 intended by the operator. On the contrary, if the printer ID from the mobile terminal 100 does not match the printer ID of the printer 10 of itself, the printing data is not sent from the mobile terminal 100 to the printer 10. Therefore, the printing by the printer not intended by the operator can be prevented.

Since the printing can be executed by the intended printer 10 using the mobile terminal 100 by the operator as above, information got by the mobile terminal 100 via the network communication, for example, can be printed by the desired printer 10 through the RFID tag T for printer casually and easily. Thus, data can be transferred surely to the desired printer 10 without physical wiring between the mobile terminal 100 and the printer 10.

Also, since the RFID tag T for printer transmits the printing data writing permission response signal to the mobile terminal 100 only when the data amount which can be stored in the memory part 155 is sufficient, occurrence of data transfer error and the like caused by transmission of the printing data to the RFID tag T for printer from the mobile terminal 100 when a free memory capacity of the memory part 155 is not sufficient can be prevented.

Moreover, when the printing by the printer 10 is completed, the printing data stored in the memory part 155 of the RFID tag T for printer is deleted, and the privacy protection can be improved and double printing can be prevented.

Next, a second embodiment of the present invention will be described referring to FIGS. 8 to 10. In the figures, the same reference numerals are given to the same or equivalent elements as those of the first embodiment, and description will be omitted.

FIG. 8 is a functional block diagram illustrating a detailed function of a printer in a printing system having the printer (printing apparatus) of this embodiment.

In FIG. 8, a printer 10A of this embodiment has a printer main body 400A and a RFID tag T' for printer connected to the printer main body 400A through a wired connecting device (e.g. external output terminal) 4.

The printer main body 400A has a memory part 404 in addition to the print head 401, the control circuit 402, and the communication control part 403. The memory part 404 is constituted as a buffer memory, for example. The memory part 404 sequentially stores the printing data and the like got by the RFID tag T' for printer from the mobile terminal 100 via radio communication.

The memory part 155 of the RFID tag T' for printer is constituted as a dual-port type memory in this example. One port 155a of the memory part 155 is connected to the control part 157. The other port 155b of the memory part 155A is an external output terminal and connected to the communication control part 403 of the printer main body 400A through the external output terminal 4.

FIG. 9 is a flowchart illustrating a printing control procedure executed by the control part 157 of the RFID circuit element To provided at the RFID tag T' for printer and corresponding to FIG. 6.

In FIG. 9, first, at Step S105, it is determined whether or not the printing data writing permission request signal is received from the mobile terminal 100, and if the printing data writing permission request signal is received, the determination is satisfied and the routine goes to the subsequent Step S115, where it is determined whether or not the memory part 155 of the RFID circuit element To has a free memory region.

After that, the same Steps S120 to S130 as the procedure shown in FIG. 6 are executed, and when the printing data is received from the mobile terminal 100 at Step S130, the routine goes to the subsequent Step S135A, where the received printing data is stored in the free memory region of the memory part 155 together with the printer ID of the printing data writing permission request signal. Then, at the subsequent Step S140, the printing request receipt response signal is transmitted to the mobile terminal 100, and this flow is finished.

FIG. 10 is a flowchart illustrating a printing processing control procedure executed by the control circuit 402 of the printer main body 400A. This flow is started when the printer 10A is powered on.

In FIG. 10, first, at Step S250, all the printer IDs transmitted from the mobile terminal 100 and stored in the memory part 155 of the RFID tag T' for printer are got through the external output terminal 4, and the routine goes to the subsequent Step S255.

At Step S255, it is determined whether or not there is a printer ID matching the printer ID of the printer 10A of itself among the entire got printer IDs. If there is a printer ID matching the printer ID of the printer 10A of itself, the determination is satisfied, and the routine goes to the subsequent Step S260, while if there is no printer ID matching the printer ID of the printer 10A of itself, the determination is not satisfied, and the routine goes to the subsequent Step S280.

At Step S260, the duplicated data of the printing data corresponding to the matched printer ID is got from the memory part 155 through the external output terminal 4. At this time, the printing data corresponding to the non-matching printer ID is preferably deleted. At the subsequent Step S265, the got printing data is stored in the memory part 404. At the subsequent Step S270, a control signal is output to the print head 401 so as to start the print head 401, printing is applied on a print-receiving object based on the printing data stored in the memory part 404, and the routine goes to the subsequent Step S275.

At Step S275, the printing data corresponding to the printer ID of the printer 10A of itself for which printing has been completed is deleted from the memory part 155 through the external output terminal 4, and the routine returns to Step S250. On the other hand, at Step S280, the printing data corresponding to the printer ID not matching the printer 10A of itself is deleted from the memory part 155 through the external output terminal 4, and the routine returns to Step S250.

Next, the operation for printing by the printing system 1 of this embodiment will be described. Here, too, the WEB information displayed on the display part 109 of the mobile terminal 100 is supposed to be printed.

When the operator of the mobile terminal 100 makes an instruction input of printing by the operation key 110, the printing data writing permission request signal including the printer ID information of the printer 10A to execute the printing is transmitted from the mobile terminal 100 to the RFID tag T' for printer of the printer 10A.

Then, the RFID tag T' for printer determines whether or not the memory part 155 has a free memory region, and if there is no free memory region in the memory part 155, the printing data writing non-permission response signal is transmitted from the RFID tag T' for printer to the mobile terminal 100. If the memory part 155 has a free memory region, the printing data writing permission response signal is transmitted from the RFID tag T' for printer to the mobile terminal 100.

When the printing data writing permission response signal is received, the mobile terminal 100 transmits the printing data (WEB information on display in this example) to be written in the RFID tag T' for printer of the printer 10A to the RFID tag T' for printer. When the printing data from the mobile terminal 100 is received, the RFID tag T' for printer stores the printing data in the free memory region of the memory part 155 together with the printer ID information. After that, the printing request receipt response signal is transmitted from the RFID tag T' for printer to the mobile terminal 100.

If the printer 10A has been already powered on, the entire printer IDs stored in the memory part 155 of the RFID tag T' for printer are transferred to the printer main body 400A through the external output terminal 4. At the printer main body 400A, it is determined whether or not there is a printer ID in the got printer IDs matching the printer 10A of itself, and if there is a matching printer ID, the printing data (duplicated data) corresponding to the matching printer ID is transferred to the printer main body 400A through the external output terminal 4 and stored in the memory part 404.

Then, the printer main body 400 drives the print head 401 and applies printing based on the printing data stored in the memory part 404 on a print-receiving object so as to produce the printed material S. After that, all the printing data stored in the memory part 155 of the RFID tag T' for printer are deleted. As mentioned above, the printing processing by the printing system 1 is completed.

On the other hand, if the printer 10 has been powered off, the printing operation is executed by the processing similar to the above when the printer is powered on after that.

As mentioned above, Step S250 shown in FIG. 10 executed by the control circuit 402 of the printer main body 400A constitutes the identification information getting portion configured to get the printer-individual identification information via the communication with the RFID tag T' for printer among the printing data or the storage-destination information of the printing data got by the RFID tag T' for printer from the operating device 100 capable of instruction of printing execution at the printer 10A via radio communication. Step S255 constitutes the second determining portion configured to determine whether or not the printer-individual identification information got by the identification information getting portion matches the printer-individual identification information of the printer 10A.

Step S260 shown in FIG. 10 constitutes the data getting portion configured to get the printing data or the storage-destination information of the printing data get by the RFID tag T' for printer from the operating device 100 via radio communication corresponding to the printer-individual identification information when it is determined by the second determining portion that the printer-individual identification information got by the identification information getting portion matches the printer-individual identification information of the printer 10A.

Step S280 shown in FIG. 10 constitutes the second deleting portion for a printing data configured to perform deletion processing on the printing data or the storage-destination information of the printing data getting by the RFID tag T' for printer from the operating device 100 via radio communication corresponding to the printer-individual identification information when it is determined by the second determining portion that the printer-individual identification information got by the identification information got portion does not match the printer-individual identification information of the printer 10A.

As mentioned above, in this embodiment, when the printer ID sent to the printer main body 400A through the RFID tag T' for printer of the printer 10A from the mobile terminal 100 matches the printer ID of the printer 10A of itself, the printing data sent from the mobile terminal 100 to the RFID tag T' for printer is taken into the printer main body 400A for printing. If the printer ID does not match, the printing data is not taken into the printer main body 400A. Therefore, similar to the first embodiment, printing by the printer not intended by the operator can be prevented. In addition to the printer ID identification function in the printer main body 400A as above, the printer ID identification function may be also provided at the side of the RFID tag as in the first embodiment. In this case, unintended printing can be prevented further surely by a synergic effect of the first embodiment and the second embodiment.

Since the printing data sent from the mobile terminal 100 to the RFID tag T' for printer is deleted if the printer ID sent from the mobile terminal 100 to the printer 10A does not match the printer ID of the printer 10A of itself, privacy protection can be further improved.

Moreover, by taking in the printing data and the like into the printer main body 400A via wired connection from the external output terminal 155b of the memory part 155 of the RFID tag T' for printer, the printing data and the like can be got from the RFID tag T' for printer without via radio communication. Therefore, there is no need to provide a reader at the printer 10A any more, which simplifies the structure and reduces the costs.

The present invention is not limited to the above embodiments but capable of various deformations in a range not departing from its gist and scope of the technical idea. The variation will be described below.

(1) If the Printing Data is Got from a Server Connected to the Network:

In the second embodiment, the printing data as an object to be printed by the printer 10A is got from the mobile terminal 100 through the RFID tag T' for printer, but not particularly limited to that, but the printing data may be stored in a database of a server and the like connected to the network, for example.

FIG. 11 is a system block diagram illustrating entire configuration of a printing system of this variation and corresponds to FIG. 1 above. The same reference numerals are given to those similar to FIG. 1 and description will be omitted.

As shown in FIG. 11, the printing system 1A has an information server 7 connected capable of information transmitting/receiving with the printer 10A through the communication line 5. In this case, instead of transmitting the printing data to the RFID tag T' for printer via radio communication and storing it in the memory part 155, the mobile terminal 100 transmits the storage destination address information of the information server 7 in which the printing data is stored to the RFID tag T' for printer via radio communication and stores it in the memory part 155.

FIG. 12 is a flowchart illustrating a printing processing control procedure executed by the control circuit 402 of the printer main body 400A in this variation and corresponds to FIG. 10 above. The same reference numerals are given to those similar to FIG. 10 and description will be omitted.

As shown in FIG. 12, if it is determined at Step S255 that there is a printer ID matching the printer ID of the printer 10A of itself, the determination is satisfied and the routine goes to the subsequent Step S260A. At Step S260A, the storage destination address information of the information server 7 in which the printing data corresponding to the matching printer ID is stored is got through the external output terminal 4. At the same time, the storage destination address information corresponding to the non-matching printer ID is preferably deleted. Then, at the subsequent Step S263, using the got storage destination address information, an access is made to the information server 7 through the communication line 5, and the printing data is got from the information server 7.

In this variation, without transmitting the printing data itself from the mobile terminal 100 and transferring it to the printer main body 400A through the RFID tag T' for printer, the printing of the desired printing data can be made by the intended printer 10A. In this case, reduction of data transfer time and storage capacity of the RFID tag T' for printer can be promoted.

(2) Others

In the first embodiment, the reader 200 is provided at the printer 10 and the printing data and the like stored in the memory part 155 of the RFID tag T for printer is taken into the printer main body 400 via radio communication, but not particularly limited to that. That is, the RFID tag T for printer is wiredly connected to the printer main body 400 as in the second embodiment, and the printing data and the like stored in the memory part 155 of the RFID tag T for printer may be taken into the printer main body 400 via wired connection.

In the second embodiment, the printing data and the like stored in the memory part 155 of the RFID tag T' for printer is taken into the printer main body 400A through the external output terminal 4, but not particularly limited to that, the reader 200 may be provided at the printer 10 as in the first embodiment so that the printing data and the like stored in the memory part 155 of the RFID tag T' for printer is taken into the printer main body 400A via radio communication or the like.

In the first and second embodiments, the duplicated data of the printing data stored in the memory part 155 of the RFID tag for a printer is sent to the printer main body, but not particularly limited to that, the printing data itself stored in the memory part 155 of the RFID tag for a printer may be sent (moved) to the printer main body.

Other than those mentioned above, methods of the embodiments and their variations may be combined as appropriate for use.

Though not specifically exemplified, the present invention should be put into practice with various changes made in a range not departing from its gist.

What is claimed is:

1. A printer, comprising:
   a printing device configured to print printing data on a print-receiving object;
   an identification information getting device configured to obtain printer-individual identification information via a communication with a RFID tag after said RFID tag receives said printer-individual identification information and printing data via a radio communication with an operating device capable of instructing a printing execution by said printer;
   a determining device configured to determine whether or not said printer-individual identification information obtained by said identification information getting device matches said printer-individual identification information of said printer; and
   a data getting device configured to obtain said printing data from said RFID tag when said determining device determines that said printer-individual identification information obtained by said identification information getting device matches said printer-individual identification information of said printer,
   wherein said printing device is configured to print said printing data on said print-receiving object when said printing data is obtained from said RFID tag by said data getting device.

2. A printer according to claim 1, wherein:
   said printer has a wired connection to an external output terminal provided at said RFID tag; and
   said identification information getting device obtains said printer-individual identification information obtained by said RFID tag via said wired connection communication through said external output terminal.

3. A printer according to claim 1, further comprising a printer antenna configured to perform a radio communication with said RFID tag, wherein said identification information getting device is further configured to obtain printer-individual identification information from said RFID tag through said printer antenna via a radio communication.

4. A printer according to claim 1, further comprising a storage device configured to store said printing data obtained by said data getting device, wherein said printing device is configured to print said printing data on said print-receiving object based on a stored result at said storage device.

5. A printer according to claim 1, further comprising, a deleting device configured to delete said printing data from said RFID tag after completion of a printing by said printing device.

6. A printer, comprising:
   a printing device configured to print printing data on a print-receiving object;
   an identification information getting device configured to obtain printer-individual identification information via a communication with a RFID tag after said RFID tag receives said printer-individual identification information via a radio communication with an operating device capable of instructing a printing execution by said printer;
   a determining device configured to determine whether or not said printer-individual identification information obtained by said identification information getting device matches said printer-individual identification information of said printer; and
   a deleting device for a printing data configured to perform a deletion processing on said printing data when said determining device determines that said printer-individual identification information obtained by said identification information getting device does not match said printer-individual identification information of said printer,
   wherein said RFID tag received said printing data via a radio communication from said operating device and said printing data corresponds to the printer-individual identification information.

7. A printer having a printing device configured to print printing data on a print-receiving object, comprising:
   an identification information getting device configured to obtain printer-individual identification information and storage-destination information of said printing data via a communication with a RFID tag after said RFID tag receives said printer-individual identification information and said storage-destination information via a radio communication with an operating device capable of instructing a printing execution by said printer;
   a determining device configured to determine whether or not said printer-individual identification information obtained by said identification information getting device matches printer-individual identification information of said printer;
   a printing-data access device configured to make an access to a storage destination of said printing data using said storage-destination information obtained by said identification information getting device and to obtain said printing data when said determining device determines that said printer-individual identification information obtained by said identification information getting device matches said printer-individual identification information of said printer; and
   a deleting device configured to make an access to said storage destination of said printing data using said storage-destination information obtained by said identification information getting device and to perform a deletion process on said storage-destination information of said printing obtained by said identification information getting device when said determining device determines that said printer-individual identification information obtained by said identification information getting device does not match said printer-individual identification information of said printer.

* * * * *